United States Patent [19]

Birch et al.

[11] 4,175,640
[45] Nov. 27, 1979

[54] VORTEX GENERATORS FOR INTERNAL MIXING IN A TURBOFAN ENGINE

[75] Inventors: Stanley F. Birch, Bellevue; John A. Lawler; Gerald C. Paynter, both of Seattle, all of Wash.

[73] Assignee: Boeing Commercial Airplane Company, Seattle, Wash.

[21] Appl. No.: 754,046

[22] Filed: Dec. 23, 1976

Related U.S. Application Data

[63] Continuation-in-part of Ser. No. 563,548, Mar. 31, 1975.

[51] Int. Cl.² .................... E04B 1/99; G10K 11/04
[52] U.S. Cl. .................... 181/213; 60/262; 60/317; 181/220; 239/265.17; 415/119
[58] Field of Search .......... 181/220, 219, 213, 215; 60/262, 226, 317, 324; 415/119, 60; 239/127.1, 127.3, 265.13, 265.17, 265.19

[56] References Cited

U.S. PATENT DOCUMENTS

| | | | |
|---|---|---|---|
| 2,934,889 | 5/1960 | Poulos | 415/119 |
| 2,944,623 | 7/1960 | Bodine, Jr. | 181/213 |
| 3,161,257 | 12/1964 | Young | 181/219 |
| 3,574,477 | 4/1971 | Dolf et al. | 415/60 |
| 3,613,827 | 10/1971 | Labussiere | 181/215 |
| 3,647,020 | 3/1972 | MacDonald | 181/219 |
| 3,693,880 | 9/1972 | Versaw et al. | 60/262 |
| 3,830,431 | 8/1974 | Schwartz | 60/262 |
| 3,910,375 | 10/1975 | Hache et al. | 181/215 |
| 4,010,608 | 3/1977 | Simmons | 60/262 |

*Primary Examiner*—Stephen J. Tomsky
*Attorney, Agent, or Firm*—Ronald E. Suter; Bernard A. Donahue

[57] ABSTRACT

Method and apparatus for reducing jet noise in a turbofan engine by causing internal mixing of fan and primary air to reduce the maximum velocity of gases at the nozzle exit plane by creating a particular type of vortex flow at a distance of at least one nozzle diameter forward of the nozzle exit plane. In one preferred embodiment for a JT8D engine an array of eight roll-top vortex generators are provided on each side of the splitter wall between fan and primary flows, and a portion of the fan air may be introduced into the central portion or core of the hot primary air.

14 Claims, 29 Drawing Figures

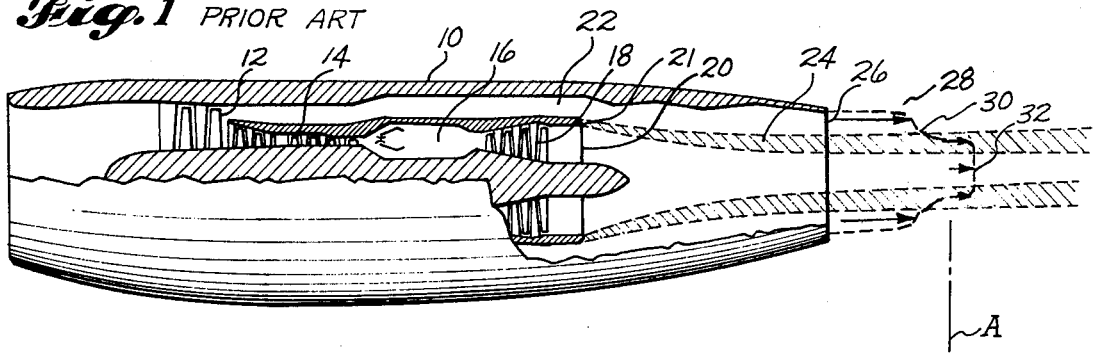
Fig. 1 PRIOR ART
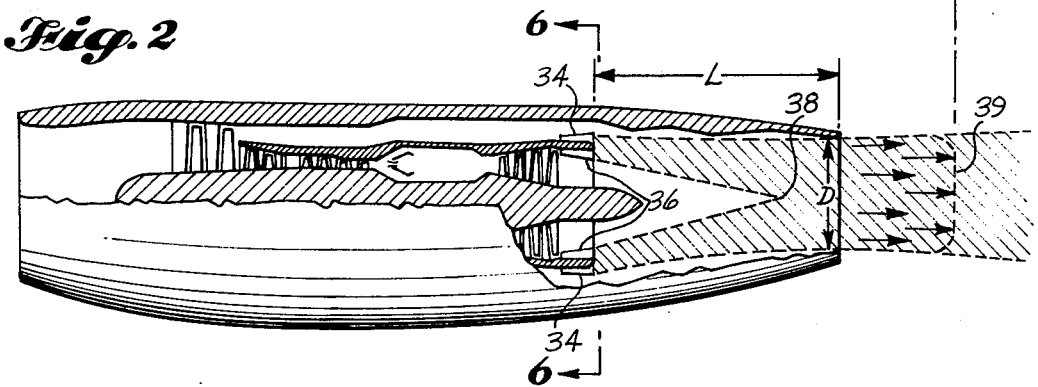
Fig. 2
Fig. 3
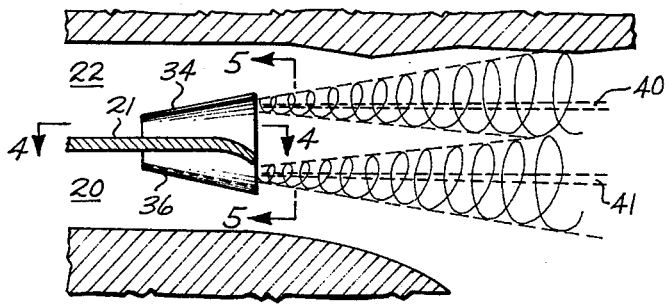
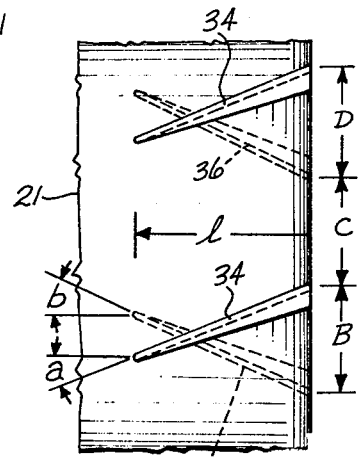
Fig. 4
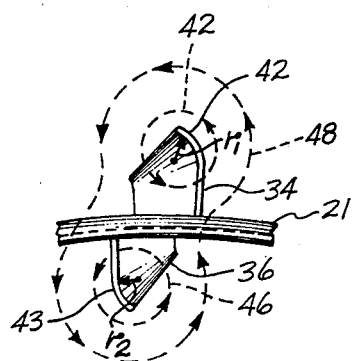
Fig. 5

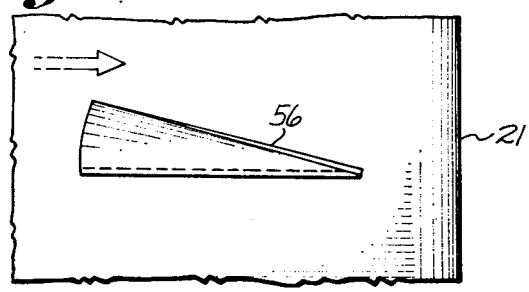
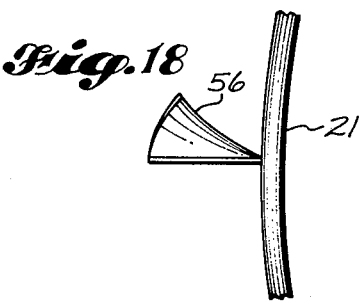
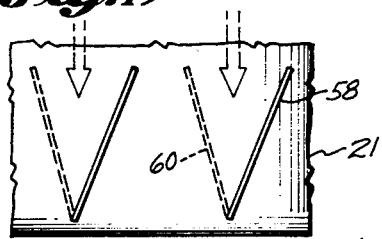
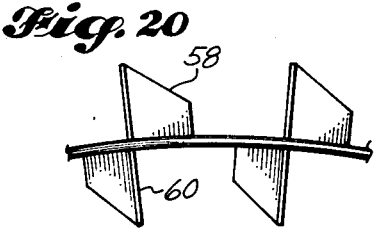
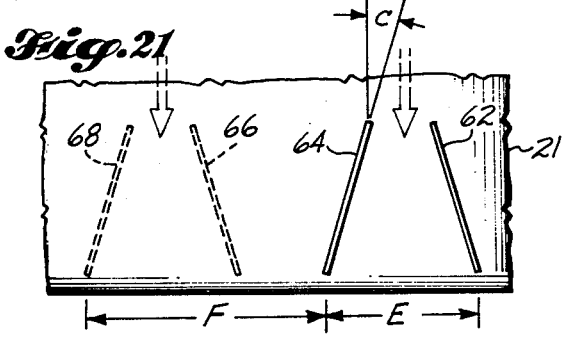
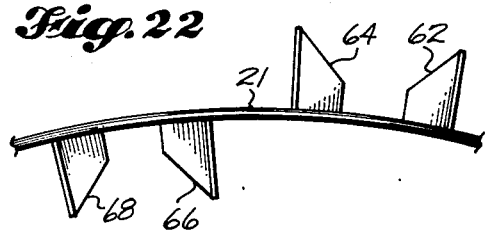
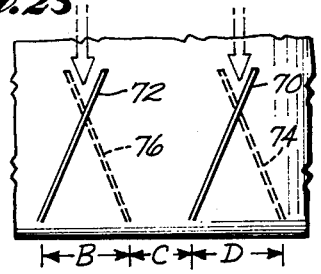
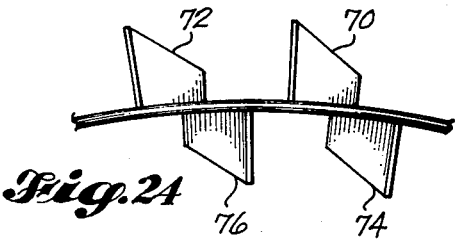
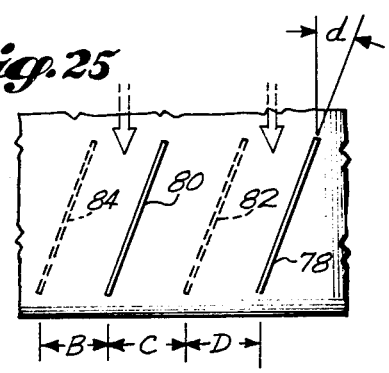
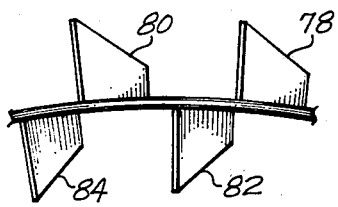

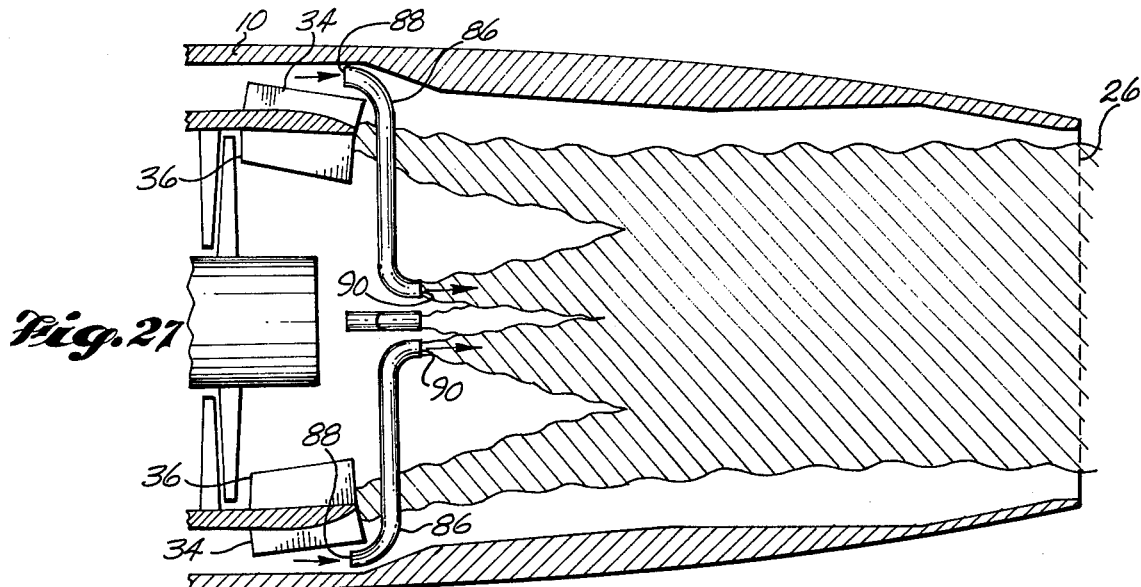
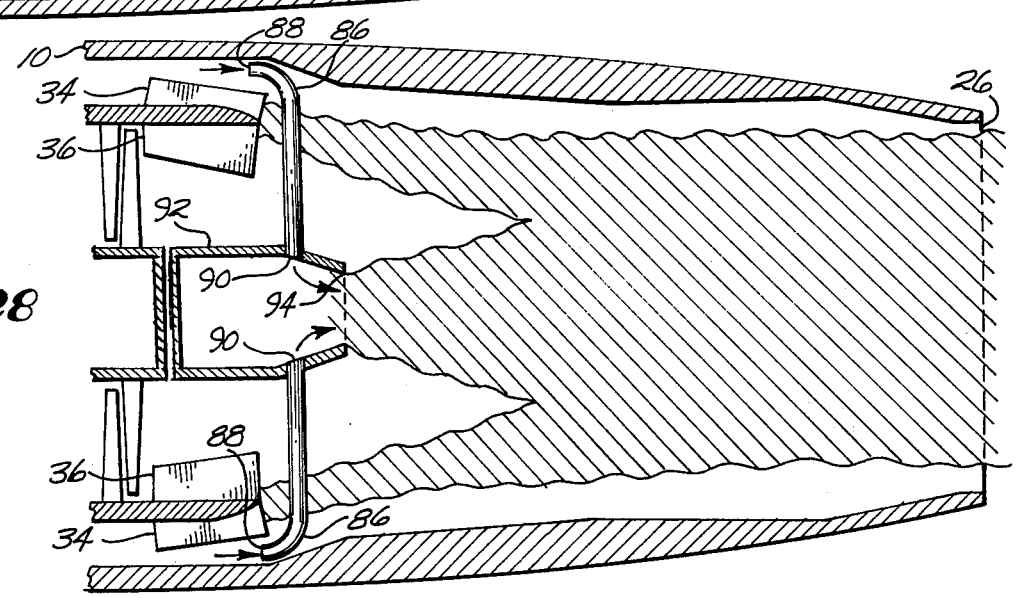
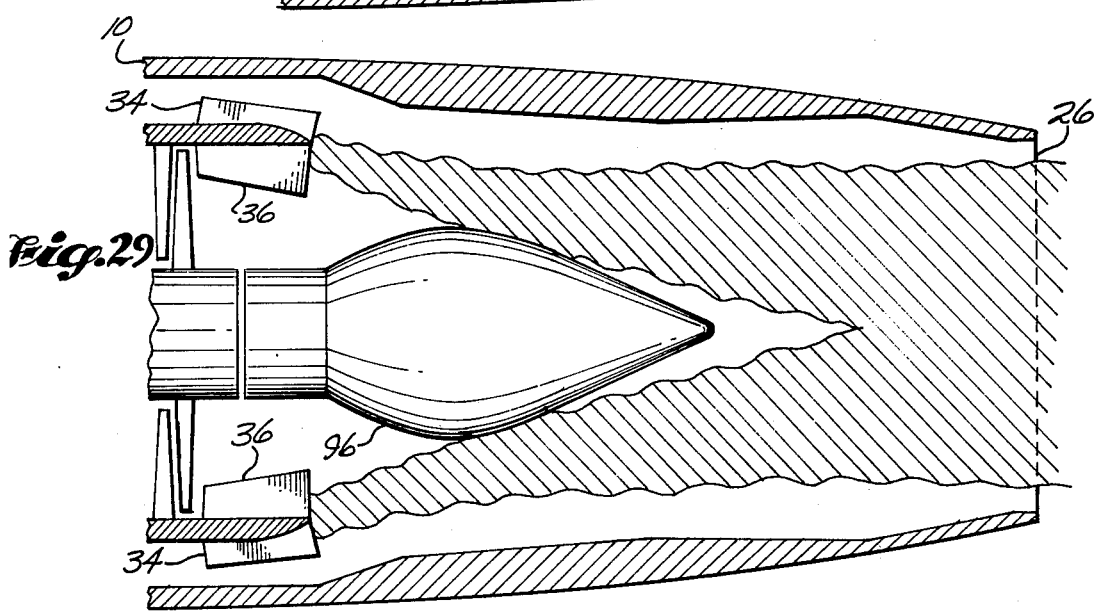

VORTEX GENERATORS FOR INTERNAL MIXING IN A TURBOFAN ENGINE

CROSS-REFERENCE TO RELATED APPLICATION

This application is a continuation-in-part of application Ser. No. 563,548, filed Mar. 31, 1975 and assigned to the same assignee as the instant application.

FIELD OF THE INVENTION

This invention relates to suppression of jet engine noise; and more particularly, to vortex generator apparatus for internal mixing of fan and primary air in a turbofan engine for suppression of jet noise.

BACKGROUND OF THE INVENTION

Noise cause by jet engine exhaust is generally considered to be proportional to at least the sixth power of the velocity of the exhaust. In a conventional turbofan engine the velocity of the hot centrally located primary flow exiting from the turbine is much higher than that of the surrounding cooler flow from the fan. In some engines, the flows are initially separated by a wall, or splitter, but are allowed to mix in a tailpipe section prior to passing through the nozzle exit plane. In certain turbofan engine installations, such as the JT8D Engine-727 airplane installation, the tailpipe length is not sufficient to allow satisfactory mixing. The higher velocity of the primary gases exiting the nozzle creates very high levels of jet noise in mixing with the ambient air.

Devices located in the region of the nozzle exit plane for mixing the jet engine exhaust with ambient air are known in the art. See for example, the U.S. Pat. Nos. to POULAS (2,934,889), to YOUNG (3,161,257), to YOUNG ET AL (3,153,319), to LABUSSIERE (3,613,827), and to DUVVURI (3,664,455). These systems are primarily concerned with creating flow patterns to enhance mixing between the exhaust stream tube and the ambient air in a region extendng extending least several nozzle diameters downstream of the nozzle exit plane. The U.S. Pat. No. to BODINE (2,944,623) describes a system to accomplish this same objective by imparting a spin to the exhaust gases aft of the choked throat of the nozzle and just forward of the nozzle exit plane. The U.S. Pat. No. to MACDONALD (3,647,020) describes radially aligned vanes located either well forward of the exit plane (FIGS. 1-7) or at the exit plane (FIGS. 8-12) to cause the exhaust gases to "whirl" to increase the "divergence" of the jet stream and therefore the rate of mixing with the ambient air. These devices all have a common primary purpose; viz., the creation of flow patterns to force mixing of the total engine exhaust stream tube with the ambient air in the region aft of the nozzle exit plane.

In contradistinction to the devices described above, the system of this invention is concerned with internal mixing of hot primary exhaust and cool fan airflows within the confines of a turbofan engine so that the exhaust stream tube has a relatively uniform velocity, substantially lower than the unmixed peak velocity, at the nozzle exit plane. The desirability of mixing these two airflows has been recognized by other investigators. See for example, the U.S. Pat. No. to RAW (3,557,830) in which guide vanes in the nature of scoops, or chutes, are employed to direct hot primary gases outwardly into the surroundong fan stream to mix the two fluid flows. One problem in such devices is a relatively high drag created by the low pressure region on the downstream face of the chute. The patent asserts that if the chutes are properly configured, a pair of small local vortices may occur over the downstream face of the chutes to relieve this problem by inducing flow of air into that region; this apparently in the manner of boundary layer control devices in common use on aircraft wing surfaces. The vortices thereby developed merely reduce the chute element drag loss but do not significantly cause mixing. This is allegedly done by the flow through the chute. Water tunnel flow visualizaton tests of such chute devices have shown that the extent of mixing of the two flow patterns leaves much to be desired.

OBJECTS OF THE INVENTION

It is a primary object of this invention to provide a simple and inexpensive apparatus for internal mixing of hot primary exhaust flow with cool fan flow for reducing jet noise in a turbofan engine.

It is a further object of this invention to provide such apparatus for mixing primary exhaust flow and fan flow within a turbine engine to achieve a substantially uniform velocity distribution across the nozzle exit plane.

It is a further object of this invention to teach the provision of a particular type of vortex generator located well forward of the nozzle exit plane to create vortex flow to mix fan and primary air in a turbofan engine.

It is a related specific object to provide in a turbofan engine an array of specifically configured vortex generators on each side of the wall dividing the fan and primary air at the aft end thereof; wherein each of the vortex generators creates a relatively large vortex flow which trails longitudinally downstream of the vortex generator; and wherein the vortices on the fan and primary sides grow larger through entrainment and interact with one another to increase the rate of mixing between the fan and primary flows to thereby cause the combined stream tube at the nozzle exit plane to have a substantially uniform velocity distribution.

It is a further object of this invention to provide additional means to introduce fan air into the hot primary exhaust flow core within the engine, either by introducing a small amount of fan air into the primary exhaust flow core, by disposing an engine tail cone in the primary exhaust flow core, or both, to divert the primary exhaust flow core so that it is mixed with the fan air in order to cool the core and reduce its velocity. "Core" herein means the center area portion of the primary air flow.

SUMMARY OF THE INVENTION

As will be apparent in the discussion which follows, the above and other objects of this invention have been achieved in the disclosed preferred embodiments wherein in a turbofan engine an array of vortex generators is attached to each side of the wall between the primary and fan flows at a distance forward of the nozzle exit plane of at least one nozzle diameter. Each of the vortex generators extends radially away from the wall into its annular passageway a distance of the order of at least 30% of the passageway width. In one preferred embodiment for a JT8D engine the generators are aligned at an angle of attack of the order of 5° to 25° with respect to the local flow direction, the outer edge of each generator preferably having a roll-top; i.e., being curved in the direction of the circular flow of the vortex, eight generators being provided on each side of the wall, and the trailing edges of the fan generators being staggered 22½° from the trailing edges of the primary generators.

In further accord with the present invention, additional means are provided for introducing a portion of fan air into the hot primary exhaust flow central portion or core within the engine, downstream of the vortex generators and upstream of the exhaust nozzle exit plane.

In still further accord with the present invention, an engine tail core or plug may be provided to divert the hot primary exhaust flow central portion or core so that it mixes with the fan air.

BRIEF DESCRIPTION OF THE DRAWINGS

FIG. 1 is a prior art aircraft engine installation, partly in section, showing the resulting flow patterns of primary and fan air.

FIG. 2 is an engine of the type shown in FIG. 1, in which the vortex generators of this invention have been installed, and showing the desired modification of the internal flow patterns.

FIG. 3 is an enlarged view taken from FIG. 2 to show the vortex generators and the resulting local flow patterns in more detail. FIG. 4 is a top view taken at 4—4 in FIG. 3.

FIG. 5 is a rear view taken at 5—5 in FIG. 3.

FIGS. 17 and 18 show an optional vortex generator configuration which has a changing angle of attack.

FIGS. 19 and 20 show an optional trapezoidal splitter configuration wherein the fan generators have their trailing edges directly above the trailing edges of the primary generators.

FIGS. 21 and 22 show an optional generator array wherein pairs of splitters in the fan passageway are staggered with respect to similar pairs of generators in the primary passageway.

FIGS. 23 and 24 show an optional trapezoidal generator array wherein the trailing edges of the fan generators are staggered with respect to the trailing edges of the primary generators.

FIGS. 25 and 26 show generator arrays wherein the fan generators have the same angle of attack as the primary generators, but they are staggered with respect to each other.

FIG. 27 is a partial, sectioned view of a turbofan engine of the type shown in FIG. 2, in which means for introducing fan air into the hot primary exhaust flow core is shown.

FIG. 28 is a partial, sectioned view of a turbofan engine of the type shown in FIG. 2 in which another embodiment of means for introducing fan air into the hot primary exhaust flow core is shown.

FIG. 29 is a partial, sectioned view of a turbofan engine of the type shown in FIG. 2 in which an engine tail core or plug is disposed in the hot primary exhaust flow stream to divert it radially outwardly so that it mixes more readily with the fan air.

DESCRIPTION OF THE PREFERRED EMBODIMENTS

Figure 6:
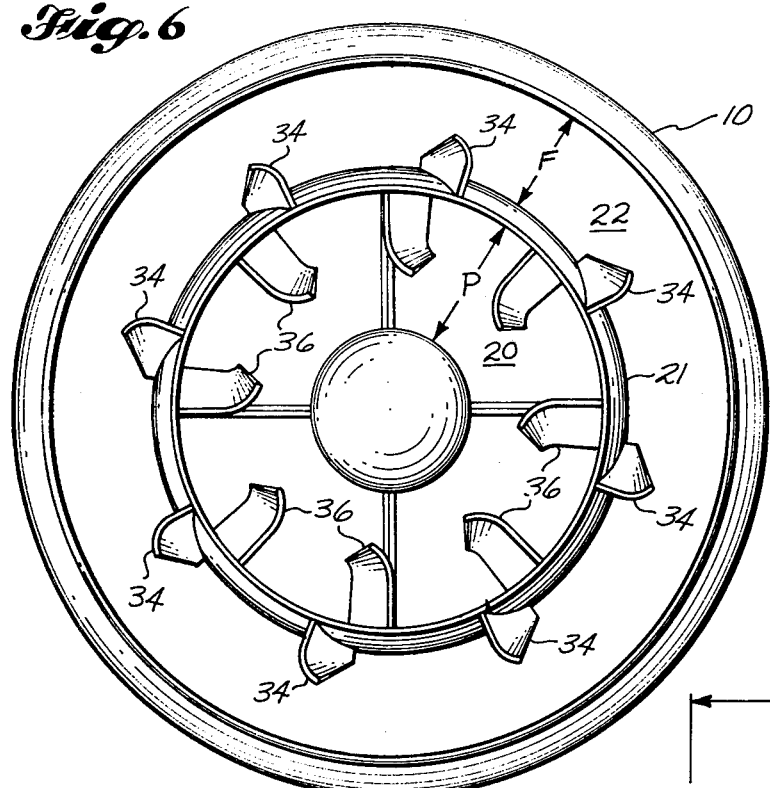
FIG. 6 is an enlarged overall rear view section taken at 6—6 in FIG. 2.

FIG. 1 shows a typical prior art engine such as the JT8D Engine-727 airplane installation. The engine indicated generally by 10 has a forward fan stage 12, a compressor section 14, a combustor chamber 16, turbine stages 18, a primary air passageway 20 for gases exiting from the turbine, and a fan air passageway 22 for air compressed by the forward fan stages 12. A splitter wall 21 provides separation of the fan and primary air and terminates at the exit plane for the primary gases. Because of the differences in velocity and pressure of the fan and primary gases there will be a mixing region, indicated generally by the hatching designated 24, wherein the two streams will be partially mixed prior to exiting at the nozzle exit plane 26. In such an installation the primary gases have a temperature of the order of 1,000° F. and a much higher velocity than the fan air, which has a temperature of the order of 200° F. Accordingly, at the exit plane the basic fan air velocity will remain relatively low, as schematically indicated by velocity vectors 28. There will be a mixing region 24 wherein the velocity is increasing, as shown schematically at 30 and then a region of very high velocity primary air as indicated by the velocity vector at 32.

FIG. 2 shows the same engine as FIG. 1, with the vortex generator arrays of this invention installed, and illustrating the modification to the resulting flow pattern. Fan generator 34 and primary generators 36 are mounted on opposite sides of the splitter wall 21 near the exit plane of the primary gases. As will become more apparent in the detailed description which follows, the generators grossly expand the mixing region between the primary and fan streams such that there is nearly complete mixing at the point designated 38, which is forward of the nozzle exit plane 26. The array of generators 34 and 36 are located a distance L forward of the nozzle exit plane. The distance L should exceed one diameter of the nozzle, and preferably is of the order of two nozzle diameters to assure complete mixing. The schematic velocity vectors 39 illustrate the desired uniform velocity of both the primary and fan stream 2. As noted previously, engine jet noise is approximately proportional to the sixth power of velocity. Accordingly, jet noise in the FIG. 2 modification will have substantially reduced noise by reason of the reduced velocity 39 over the velocity of the central stream tube 32 in FIG. 1, as shown by the comparison line designated A.

FIG. 3 is an expanded view taken from FIG. 2, showing the vortex generators 34 and 36 in more detail. These generators are shaped and arranged to create vortex flow as indicated in this drawing with vortex flow centers located in regions 40 and 41.

FIG. 4 is a top view taken at 4—4 in FIG. 3 and showing the generators arranged at an angle "a" with respect to the engine centerline for the fan generators, and arranged at an angle "b" with respect to the engine centerline for the primary generators 36. As will readily be recognized by persons skilled in this art, the angle of attack of a vortex generator with respect to the local flow direction is the critical parameter in obtaining desired vortex flow characteristics, rather than the angle with respect to a fixed reference, such as the engine centerline. Accordingly, in obtaining an optimum angle "a" and "b" for the generators, local flow conditions must be taken into account. In the case of most aircraft engines, the controlling local flow direction is due to "swirl" created by the turbomachinery elements. Such "swirl" is a flow in a circular direction in a plane perpendicular to the engine centerline. If there is no "swirl" in the engine at this location, the generators should be aligned at an angle with respect to the engine centerline of the order of 5° to 25° to obtain an appropriate angle of attack for vortex flow of the type contemplated by this invention. However, since it is not uncommon for conventional engines to have local flow or "swirl" angles ranging up to 20° in either the primary or the fan flow, these conditions must be taken into account. Hence, the angles "a" and "b" should be adjusted to give an angle of attack with respect to the local flow of the order of 5° to 25°.

In FIG. 4 it can be seen that the primary generators 36 are spaced apart by a distance B+C and the fan generators are spaced apart by a distance C+D, while the trailing edges of fan generators 34 are staggered with respect to the trailing edges of primary generators 36 by a distance B. These distances are conveniently measured in degrees because of the circular configuration of the engine. In one of the better embodiments tested to date by Applicants (eight generators on each side of the splitter wall, as illustrated), the dimensions B and D have each been set at $22\frac{1}{2}°$ and the dimensions B+C and C+D have been set at 45°.

FIG. 5 is a rear view taken at 5—5 in FIG. 3 and shows more detail of the shape of the generators 34 and 36, and illustrates the local vortex flow as well as the combined interacting flow pattern created by the pair of generators on opposite sides of the splitter wall 21. The generators have been characterized as a roll-top variety because the outer portions are curved as shown at 42 and 43 in the drawing. Radii curvatures are shown as $r_1$ and $r_2$ respectively. The angle of attack and shape of such a generator will cause a local circular vortex flow centered about the leeward side of each generator as indicated by flow patterns 42 and 46. The circular flow of each generator will enlarge downstream as indicated in FIG. 3 until it interacts with the vortex flow created by its corresponding generator on the opposite side of splitter 21. FIG. 5 illustrates this coaction or interaction by the overall hourglass flow pattern designated 48.

FIG. 6 taken at 6—6 in FIG. 2 is a rear view of the entire engine in the region of the splitter 21, and illustrates a preferred embodiment wherein an array of eight fan splitters and an array of eight primary splitters are arranged on opposite sides of splitter 21 to provide flow characteristics of the type described in connection with FIG. 5. The radial width of the fan passageway is designated F and the radial width of the primary passageway designated P. For optimum results, the generators should extend radially from 30 to 60% of the distance across their respective passageway widths F and P. This is something of a departure from normal wortex generator design for boundary layer control. See, for example, the Text by Lachman "Boundary Layer and Flow Control", Pergamon Press, 1961, which fully discusses design details of conventional vortex generators for boundary layer control of exterior aerodynamic surfaces. As is well-known by persons skilled in the aerodynamics art, such generators create relatively small vortices for the purpose of entraining air into the boundary layer and normally range in height from 50% up to 100% of the thickness of the boundary layer.

For purposes of this invention the relative vortex strengths should be higher than those of boundary layer devices in order to obtain the required mixing of the two streams of fluid. A large radius vortex flow is desired to promote mixing and interaction between vortices on opposite sides of the splitter wall. A relatively high lift acting on the generator is desired as vortex strength is proportional to lift.

Figure 7:
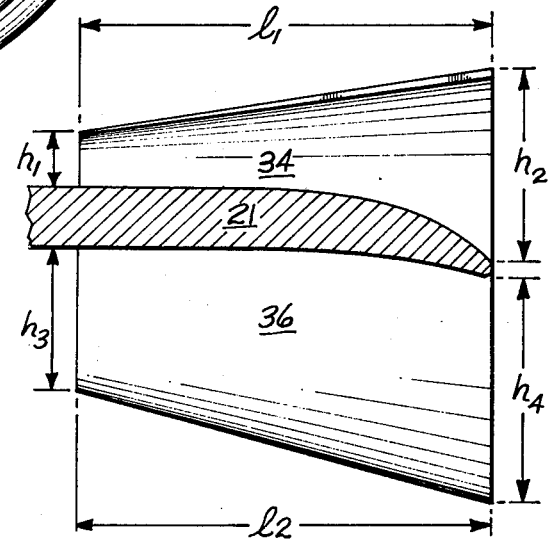
FIG. 7 is an enlarged detailed view of the vortex generators of the preceding figures.
Figure 8:
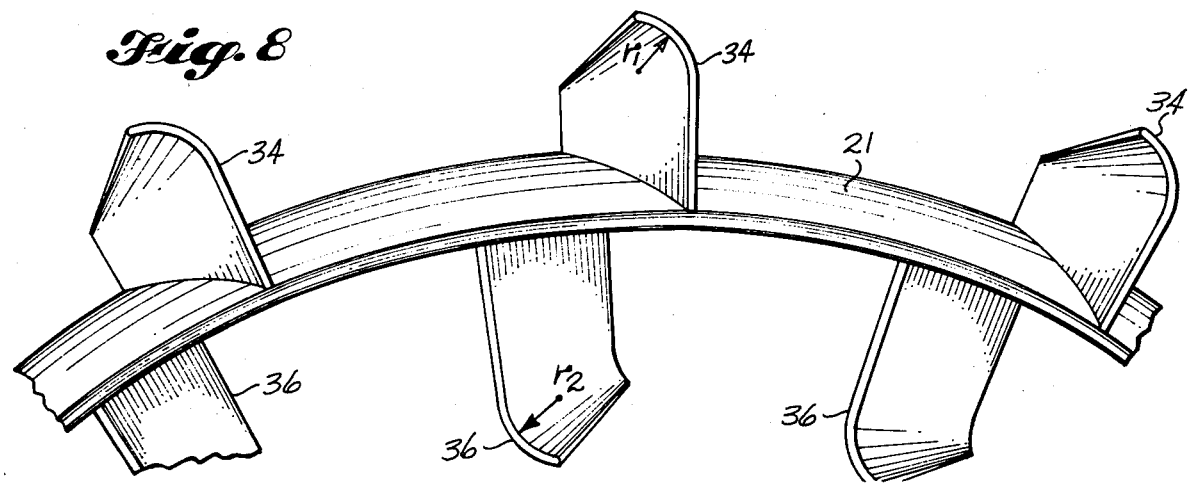
FIG. 8 is an enlarged fragmentary section of a portion of the vortex generator array of the preceding figures.

FIGS. 7 and 8 are enlarged detailed views showing dimensions of the vortex generators of the preceding figures. In one preferred embodiment for a JT8D engine having F=5" and P=10" the dimensions were as follows: $h_1$, $h_2$, $h_3$, and $h_4$ were 2", 4", 4" and 6" respectively, $l_1$ and $l_2$ were identical at 12"; and $r_1$ and $r_2$ were 2" and 3", respectively.

Figure 9:
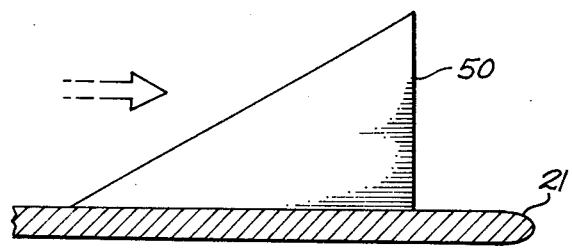
FIG. 9 shows an optional triangular vortex generator.

FIG. 9 is an optional triangular vortex generator 50 having generally lower losses, but reduced vortex strength.

Figure 10:
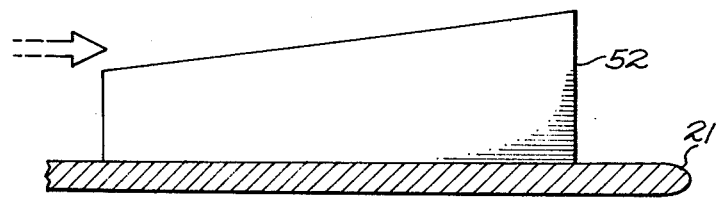
FIG. 10 shows an optional trapezoidal vortex generator.
Figure 11:
FIG. 11 shows an optional rectangular vortex generator.
Figure 12:
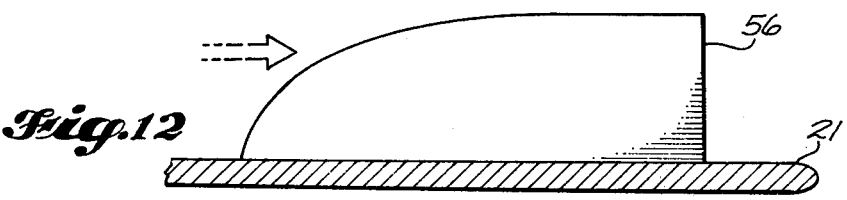
FIG. 12 shows a optional curved leading edge rectangular vortex generator.

FIGS. 10, 11 and 12 are respectively trapezoidal (52), rectangular (54), and curved (56), embodiments which offer obvious tradeoffs in terms of drag losses against vortex strength.

Figure 13:
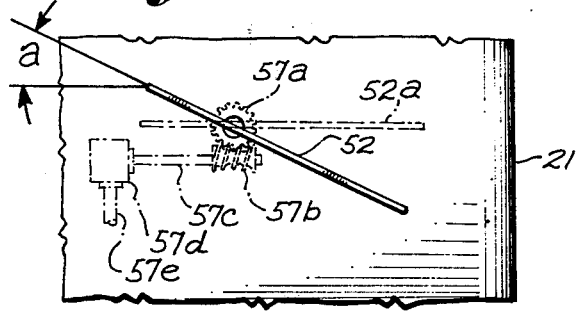
FIGS. 13 and 14 show the trapezoidal configuration of FIG. 10 arranged at an appropriate angle of attack on the splitter wall, with mechanism shown for changing the angle of attack as desired.
Figure 14:
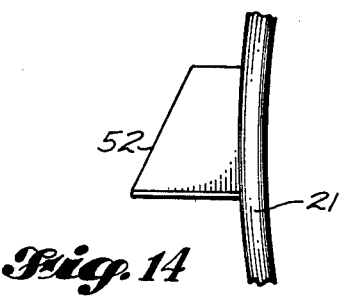

FIGS. 13 and 14 show the trapezoidal embodiment 52 mounted on the splitter wall at an appropriate angle "a" with respect to the engine centerline. Means for changing the angle "a" and hence the angle of attack with respect to the local flow direction are shown as 57a—57e. Rack member 57a is rigidly connected to generator 52. A pinion 57b is driven by a torque shaft 57c which is connected to a small rotary hydraulic actuator 57d. Hydraulic fluid is selectively fed to actuator through hydraulic tubing 57e from a pressure source (not shown) when it is desired to rotate generator 52 to a new angle of attack. The actuators for each generator in an array may be individually controlled, as shown, or they may be ganged together for simultaneous movement.

Figure 15:
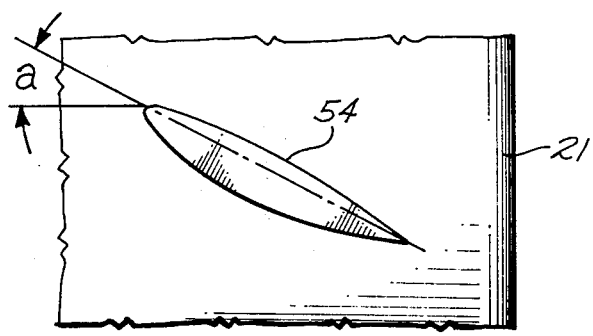
FIGS. 15 and 16 show an optional airfoil shaped vortex generator arranged at an appropriate angle of attack on the splitter wall.
Figure 16:
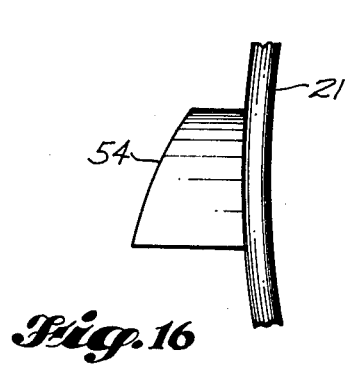

FIGS. 15 and 16 illustrate an aerodynamically shaped generator 54 which may be patterned after any desired airfoil shape to obtain virtually any desired combination of lift (hence vortex strength) and drag characteristics.

FIGS. 17 and 18 illustrate still another variation of the concepts of this invention wherein in a generator 56 the relative angle of attack changes in a radial direction outwardly from the splitter wall 21. Other shapes may be readily devised wherein the angle of attack will vary longitudinally along the length of the generator. Such refinements could take into account local variations in flow directions cuased by unusual turbomachinery induced swirl patterns.

FIGS. 19 and 20 show still another embodiment wherein the fan generators 58 have their trailing edges aligned with the trailing edges of the primary generators 60. The resulting flow pattern and individual vortex strengths will be similar to those shown in FIG. 5 for the staggered embodiment, but testing to date has shown that the interaction between vortices is not quite as effective. FIGS. 21 and 22 illustrate still another embodiment contemplated by this invention wherein staggered pairs (62, 64, and 66, 68) are provided on opposite sides of splitter wall 21, at opposing angles "c" to the engine centerline.

FIGS. 23 and 24 illustrate nonroll-top trapezoidal generators 70, 72 and 74, 76 spaced and arranged in the same manner as the roll-top generators 34, 36 of FIGS. 1–8.

FIGS. 25 and 26 show an optional array of generators 78, 80 and 82, 84 which have generally parallel alignment at an angle "d" with respect to the engine centerline. As will be appreciated by persons skilled in this art, the sense of rotation of the vortices on opposite sides of the splitter wall will be opposing, and therefore the cooperative interaction between vortices should be less than that of other configurations, although individual vortex strength and drag losses are similar.

Model tests, full scale engine tests and water tunnel tests show that a substantial mixing of the hot primary gas with the cooler fan exhaust takes places with the vortex generators installed according to the invention, although the noise attenuation resulting therefrom may be less than theoretically expected in some engine configurations. Studies of velocity, pressure and temperature of the exhaust gas at various stations aft of the vortex generators indicate that in certain turbofan engine configurations, a small central core of hot primary gas still exists, and it is believed that this small core is responsible for the smaller than anticipated noise attenuation.

One solution to this problem is depicted in FIG. 27, which is a partial, sectioned view of a modified form of a turbofan engine of the type shown in FIG. 2, in which means for introducing fan air into the hot primary exhaust flow central portion or core is shown. The means comprise a plurality of tubes 86 having inlet ends 88 disposed in the fan air stream and outlet ends 90 centrally disposed in the hot primary exhaust flow core. The tubes 86 introduce a small portion of fan exhaust air into the hot primary exhaust flow core for mixing therewith. We have found that four tubes, introducing 3% to 20% of the fan exhaust air into the hot primary exhaust flow core, works satisfactorily. The mixing reduces the temperature of the primary exhaust gas flow core and reduces its velocity.

FIG. 28 is a partial sectioned view of a modified form of a turbofan engine of the type shown in FIG. 2 in which another embodiment of means for cooling and thereby effectively introducing fan air into the hot primary exhaust flow core is shown. In this embodiment, a hollow truncated engine tail cone 92 is disposed such that the outlet ends 90 of the tubes 86 terminate therewithin. The cone 92 has an outlet 94 which permits the portion of fan air introduced by the tubes 86 into the cone 92 to flow into the hot primary exhaust flow core region.

FIG. 29 is a partial sectioned view of a modified form of a turbofan engine of the type shown in FIG. 2 in which an embodiment of means for partially blocking and thereby diverting the hot primary exhaust flow core is shown. In this embodiment an engine tail cone 96 is disposed in the engine in the primary exhaust downstream of the first and second vortex generators and upstream of the nozzle exit plane so that the hot primary exhaust flow central portion or core is diverted by the cone 96 and forced to mix with the fan exhaust air.

Based on the foregoing, it is apparent that the vortex generator concepts of this invention, both with the means for blocking the hot primary exhaust flow core and diverting it to mix with the fan exhaust air, and without that means, provide an inexpensive, lightweight, easily retrofitable means for creating vortex flow for changing the characteristics of the stream tube exiting the nozzle of an aircraft jet engine.

Many variations or modifications of the preferred embodiments shown will occur to persons skilled in this art. Such variations or modifications are not considered to depart from the spirit and scope of the invention. Therefore, it is intended in the appended claims to cover all such variations and modifications.

What is claimed is:

1. In a turbofan engine having an annular fan fluid flow exhaust passageway located between an outer engine cowling and a splitter wall structure, and an annular primary fluid flow exhaust passageway located inside of said splitter wall structure, apparatus for internal mixing of fan exhaust with primary exhaust forward of the nozzle exit plane of said engine comprising:
a vortex generator attached to said splitter wall structure at least one nozzle diameter forward of said nozzle exit plane and extending radially into one of said annular passageways a distance of at least 30% of the width of the passageway, and mounted to have an angle of attack with respect to the local flow direction ranging from 5° to 25°.

2. The apparatus of claim 1 wherein at least one vortex generator is mounted in the fan fluid flow passageway and at least one vortex generator is located in the primary fluid flow passageway.

3. The apparatus of claim 2 which includes at least four fan vortex generators in the fan fluid flow passageway and at least four primary vortex generators in the primary fluid passageway.

4. The apparatus of claim 3 wherein the angle of attack of the fan vortex generators with respect to the local flow direction is in an opposite direction from that of the angle of attack of the primary vortex generators with respect to the local flow direction such that an hourglass flow pattern is promoted downstream of the vortex generators by interaction of the vortices of the fan and primary generators.

5. The apparatus of claim 4 wherein the trailing edges of the fan vortex generators are staggered with respect to the trailing edges of the primary vortex generators.

6. The apparatus of claim 5 which includes at least eight vortex generators in the fan passageway and at least eight vortex generators in the primary passageway and the trailing edges of the fan and primary generators are staggered 22½°.

7. The apparatus of claim 4 wherein each vortex generator terminates at its outer radial extremity in a surface curved in the direction of vortex flow to promote generation of the vortex and reduce losses in a region of potential separation of flow by providing a curved aerodynamic surface over which fluid can travel from the high pressure side of the generator to its low pressure side.

8. The apparatus of claim 7 wherein the generator is generally trapezoidal in form with its minimum radial height at its leading edge.

9. The apparatus of claim 7 wherein said surface curved in the direction of vortex flow has a radius of curvature of the order of one half of the radial height of the generator at its trailing edge.

10. The apparatus according to claim 1 which additionally includes means connected to said vortex generator for changing its angle of attack.

11. Apparatus for internal mixing of fan air with primary exhaust forward of the nozzle exit plane of a turbofan engine as defined in claim 1, additionally comprising:

means in said engine for introducing a portion of fan air into the hot primary exhaust flow core for mixing therewith.

12. Apparatus for internal mixing of fan air with primary exhaust forward of the nozzle exit plane of a turbofan engine as defined in claim 11, wherein said means for introducing a portion of fan air into the hot primary exhaust flow core comprises a plurality of tubes disposed within said engine, each of said tubes having an inlet disposed in said fan air and an outlet disposed in the region of said hot primary exhaust flow core, whereby a portion of fan air is introduced into said hot primary exhaust flow core for mixing therewith.

13. Apparatus for internal mixing of fan air with primary exhaust forward of the nozzle exit plane of a turbofan engine as defined in claim 12, wherein a hollow truncated engine tail cone is disposed in said engine in said primary exhaust downstream of said first and second vortex generators and upstream of said nozzle exit plane, said outlet end of each of said tubes terminating in said tail cone, and said tail cone having a fluid outlet to said hot primary exhaust flow core.

14. In a turbofan engine having an annular fan fluid flow exhaust passageway located between an outer engine cowling and a splitter wall structure, and an annular primary fluid flow exhaust passageway located inside of said splitter wall structure, a method for internal mixing of fan exhaust with primary exhaust forward of the nozzle exit plane comprising:

creating a first vortex flow pattern on the outer side of said splitter wall structure;

creating a second vortex flow pattern on the inner side of said splitter wall structure;

combining said first and second vortex flows within said engine downstream of said wall structure and upstream of said nozzle exit plane including introducing a small amount of fan air centrally into the primary exhaust core;

whereby the exhaust stream tube has a substantially uniform velocity at said nozzle exit plane.

* * * * *